United States Patent [19]

Bellanca

[11] Patent Number: 4,656,934

[45] Date of Patent: Apr. 14, 1987

[54] PASTA PREPARATION APPARATUS

[76] Inventor: Guido Bellanca, 220 E. 54th St., New York, N.Y. 10022

[21] Appl. No.: 763,247

[22] Filed: Aug. 7, 1985

[51] Int. Cl.[4] .................. A47J 37/12; B01F 15/06
[52] U.S. Cl. ........................ 99/348; 366/219; 366/144; 366/146
[58] Field of Search .................. 99/348, 485, 483; 366/219, 239, 240, 208, 209, 144, 145, 146

[56] References Cited

U.S. PATENT DOCUMENTS

| | | | |
|---|---|---|---|
| 3,504,713 | 5/1970 | Gmur | 366/219 |
| 3,635,150 | 1/1972 | Piedallu | 99/348 |
| 3,688,684 | 9/1972 | Piedallu | 99/348 |

*Primary Examiner*—Robert W. Jenkins

*Attorney, Agent, or Firm*—John S. Hale

[57] ABSTRACT

A device is disclosed for simultaneously applying heat to food such as pasta while applying agitation in the form of a repetitive irregular rotational motion similar to that of a chef constantly turning the contents of a pan while it is being heated. The device of the invention comprises a container mounted on an elongated beam assembly which is horizontally disposed for repetitive reciprocating movement to impart the desired rotational motion to the container holding the food while it is being heated. One end of the beam assembly is connected to a rotating arm which imparts a reciprocating movement to the beam. The beam assembly is supported at a point between its two ends to accommodate the reciprocating motion imparted by the rotating wheel.

19 Claims, 5 Drawing Figures

PASTA PREPARATION APPARATUS

BACKGROUND OF THE INVENTION

This invention relates generally to a culinary apparatus and, more specifically, to an apparatus providing a repetitive rotational movement to a container holding a food preparation such as pasta while applying heat.

The proper, simultaneous application of heat and agitation to pasta such as fettuccine, or other foods while coating the same with a sauce is a critical step in the preparation of the particular food dish. While the application process can be briefly described as exposure of a pan containing the food ingredients to heat during agitation of the pan, this only barely indicates the interrelationship of factors which can make the difference between a properly prepared food dish such as fettuccine alla Alfredo and an unacceptable and poorly prepared food dish. The formulation of the sauce used with such dishes is, for example, itself an important factor, and may incorporate a dairy product ingredient such as cheese, cream, milk or melted butter which is especially sensitive to even momentary application of localized high heat. Thus one purpose of pan agitation is to circulate the pasta and the sauce and take advantage of heat without permitting local burning and the radical alteration of flavor by dissolution of the combustion products in the sauce. Another purpose of agitation is to assure that the pasta is circulated thoroughly and coated evenly by the sauce at a rate appropriate to achievement of the coating consistency desired by those consumers with an educated taste for pasta dishes.

In the prior art, the process of agitation for pasta preparation, coating the same with sauce and the avoidance of sauce burn and pasta hardening while maintaining sauce consistency has been conducted by hand. Those who possess the physical strength, experience, coordination and concentration necessary for tossing the pasta in the pan over an extended period of time, and the visual and taste skills necessary to determine the on-going status of the preparation process, are considered very valuable food preparation specialists and are paid accordingly. Thus the end product of the process has long been considered a delicacy, and the restaurant industry has recognized that while customers will pay generously for a correctly prepared product and continue to frequent a restaurant that serves a correctly prepared dish, it is also true that customers will not return for a poorly prepared product. Accordingly, it can be seen that it is highly desirable to provide an automated mechanism for pan agitation which provides a complex, rotary motion sufficient to circulate pasta and sauce while applying heat to achieve a food dish comparable to that heretofore requiring the undivided, manual attention of a skilled chef.

SUMMARY OF THE INVENTION

The present invention comprises a device for simultaneously agitating and applying heat to a food preparation such as a pasta which is coated by a sauce. More specifically, the present invention is directed to a device which applies an irregular rotary motion repetitively to the container or pan holding the food during heating so as to effectively mimic the rotary, tossing motion of a skilled individual manually applying agitation to a pan while the food dish is being prepared.

The device of the present invention comprises a beam assembly which is disposed in approximately a horizontal position with at least one of its ends mounted to an arm which is rotatably mounted such that rotation of the arm produces a reciprocating movement by the horizontal beam assembly and a combined rotary and reciprocal movement by the pan or container which is disposed away from the arm at a point on the beam assembly. In addition to the point of pivotal engagement with the arm, the beam assembly is otherwise supported to accommodate reciprocal movement. This support can, for example, be a point of slidable engagement with a longitudinally disposed slot in the beam assembly.

Alternatively, the beam assembly is attached between two wheels, and an irregular rotary movement can be imparted to the receptacle holding the food, by providing that the respective distances between the center of rotation of each wheel and the point of engagement of the beam assembly with that wheel is different for each of the two wheels. Thus, if the ends of the base assembly are attached at essentially the circumferential edge of each wheel, different size wheels can be used in order to produce the desire irregularity of motion, or, if wheels of the same size are used, the point of attachment can be varied so that one end of the beam assembly is attached at a point further from the center of rotation than the other end is attached on the other wheel. The necessary motive force to cause reciprocal movement by the beam assembly is only applied to one of the wheels so that the other end of the beam assembly follows in response to the force applied through the beam assembly.

The motive force supplied to the base assembly is supplied by means of an electric motor either directly turning one of the rotating wheels or indirectly through a system of belts, chains or gears. The speed of the rotary agitation that is applied to the container of food can conveniently be controlled by a varying the rotational speed applied to the either drive wheel by the motor through a potientometer or other means well known in the art.

The present invention therefore provides an efficient means for automatically applying a repetitious, irregular rotary motion to a pan or other container of food such as pasta and sauce while it is being heated in a manner that effectively reproduces the rotary, tossing motion heretofore achieved manually by only trained and highly skilled individuals.

These and other objects and advantages of the present invention will become more readily apparent by reference to the following detailed description thereof, when ready in conjunction with the accompanying drawings.

DETAILED DESCRIPTION OF THE DRAWINGS

Figure 1:
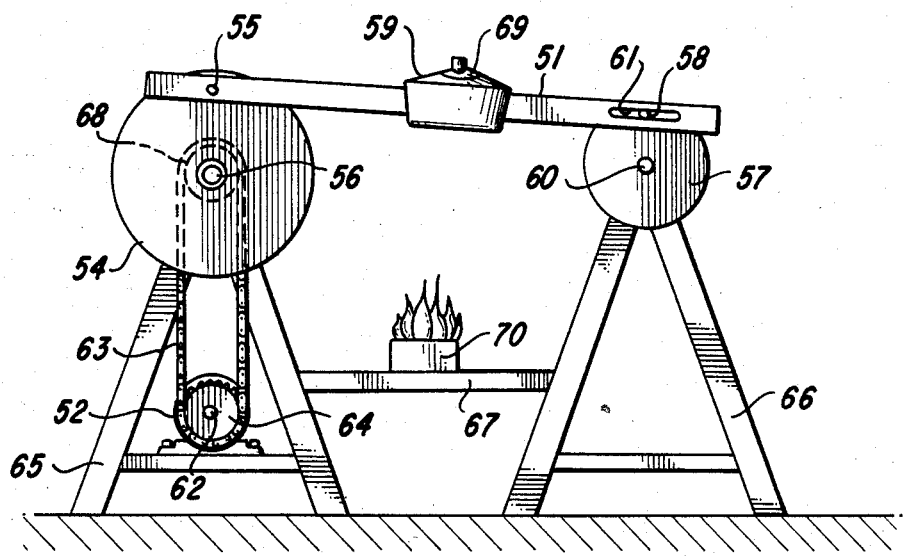
FIG. 1 is a side elevation view of one embodiment of the device of the present invention.
Figure 2:
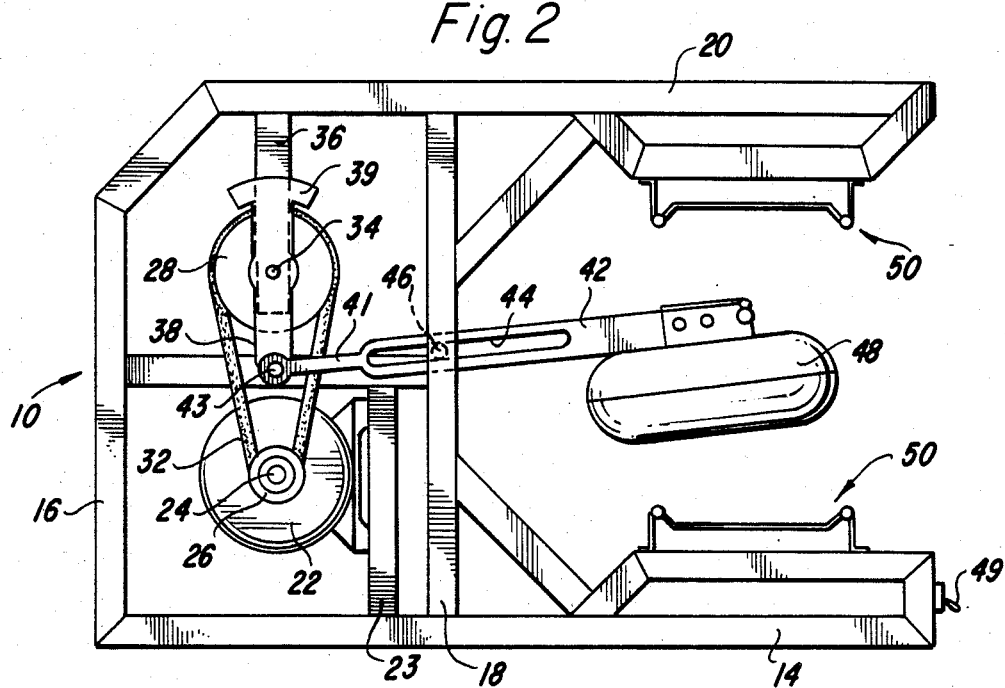
FIG. 2 is a side elevation view of the preferred embodiment of the invention.
Figure 3:
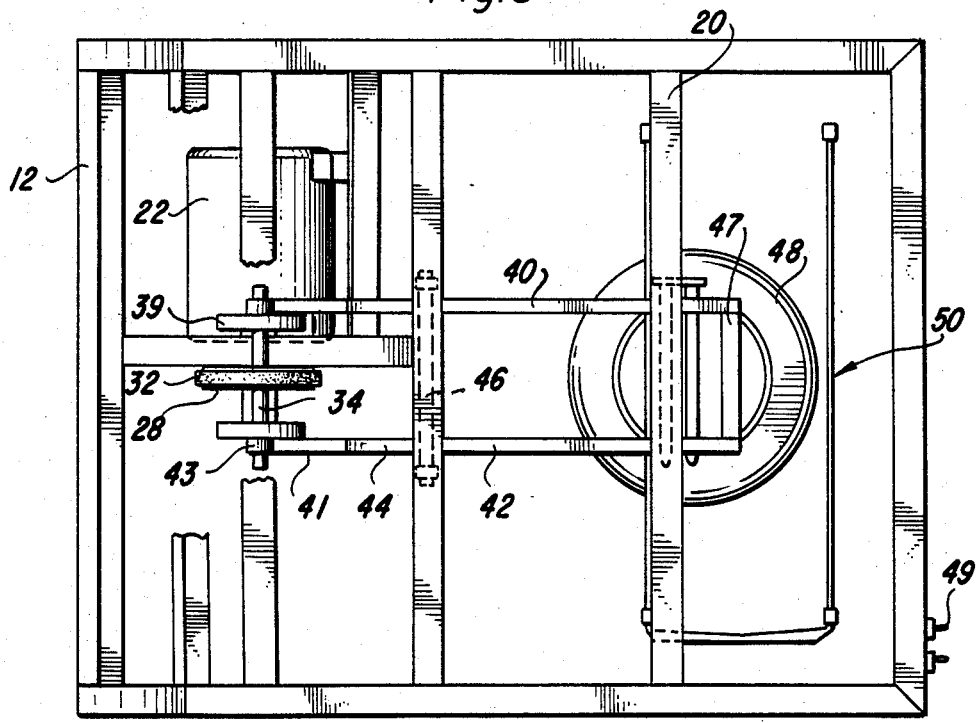
FIG. 3 is a top plan view of the embodiment shown in FIG. 2.
Figure 4:
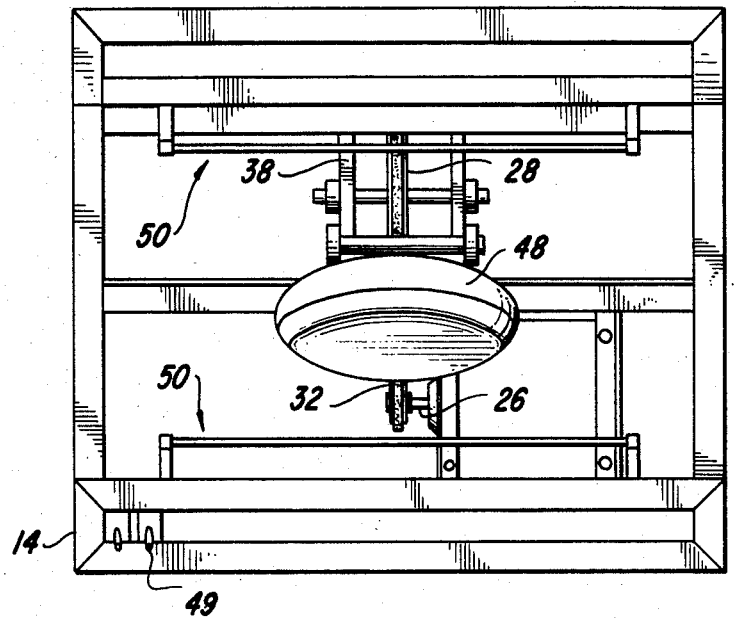
FIG. 4 is a front elevation view of the embodiment shown in FIG. 2.
Figure 5:
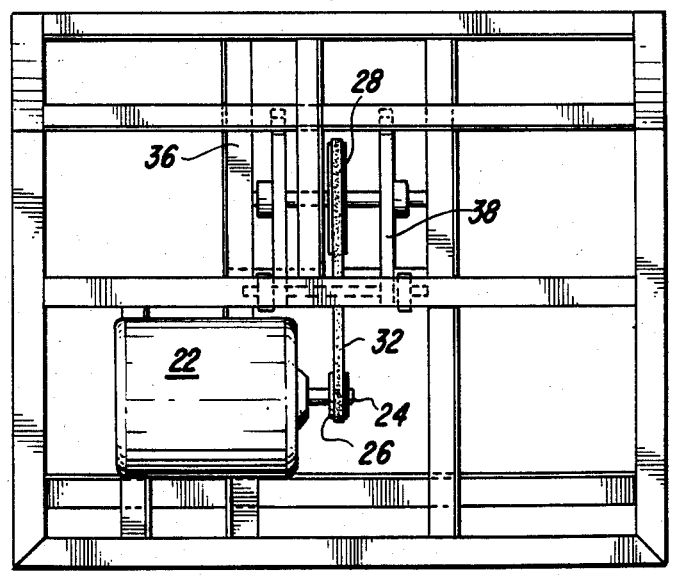
FIG. 5 is a rear elevation view of the embodiment of FIG. 2.

FIGS. 2 through 5 illustrate a preferred embodiment and best mode for carrying out the present invention. Directing attention to these figures, which are to be considered collectively, the food preparation device 10 is supported by a generally box shaped frame 12. The frame 12 is constructed with a base 14, end members 16, support posts 18 and top members 20. A standard D.C. motor 22 in mounted to a support structure 23 secured to base 14. The motor 22 when energized by a source of electricity not shown drives a shaft 24 on which is mounted pulley 26. The pulley 26 is connected to and drives a larger diameter pulley 28 via V-belt 32. Pulley 28 is fixably mounted on a rotatable shaft 34 which is journalled in opposing bearing races which are mounted to support arms 36 extending downward from the top of the frame 12. A pair of counterweighted arms 38 are rotatably mounted on shaft 34. Each of the counterweighted arms 38 has one end which is connected to the respective horizontal beam 40 or 42 through a yoke and a pin assembly 43. Thus, the rotary motion supplied from shaft 24 via the pulley assembly to shaft 34 causes the counterweighted arms to rotate in a vertical plane about the axis of shaft 34 while at the same time imparting a rotary motion to the proximal ends 41 of the beam members 40 and 42 to which the arms 38 are attached. The distal ends of the arms positioned from the beam members are provided with counterweights 39 which counterbalance the weight of the beam members, cross support pieces and the food container. Each of the horizontal beam members 40 and 42 defines a longitudinally disposed slot 44 which slidably engages a slide rod 46 mounted to posts 18. Alternatively, a support pin or lug can be rigidly attached an upright post in place of slide rod 46. The rod 46 provides a support point for slidable, reciprocal movement by the two beams members 40 and 42. A horizontal support bar 47 connects the distal ends of the two beam members 40 and 42 and provides a means of attachment to container 48 which is adapted to be opened and closed in conventional manner not shown. The container 48 is however preferably two pieced and hinged to allow easy access and closing of the container. Disposed on the frame 12 both above and below the container 48 are heating means 50 of which can be either radiant electric heat or gas burners to supply evenly applied heat both to the top and bottom of the container 48. The heaters shown are electric resistance heaters and can be activated by switch 49 which is connected to a source of electric power not shown. Two switches are shown for operation of the top and bottom heaters. The heaters are well known in the art and can be commercially obtained.

An additional embodiment for carrying out the present invention will be appreciated by having specific reference to FIG. 1 of the drawings. In this embodiment, a generally horizontal beam or rod 51 engages at two points, 55 and 58, proximate the ends of the beam, respective vertically mounted wheels 54 and 57 of different diameter sizes having a common plane of rotation. Motive force to cause the initial turning of the wheel 54 is provided conveniently by motor 52 through shaft 62, gear 64, a chain 63 and gear 68. Gear 68 and wheel 54 are axially mounted to shaft 56. The motor 52 is a standard off the shelf D.C. motor with a reducer. Approximately mid-point on the beam 51, a receptacle or food container 59 having a cover 69 is mounted. The container 59 is adapted to hold a food such as pasta. The cover 69 is provided with fastening means such as clasps or spring mounts to hold it securely on the container during the rocking motion. Wheel 57 is mounted to rotate freely on axle 60 in response to reciprocating movement by beam 51. The wheel 57 is pivotally attached to the beam 51 by means of a pin or lug 58 which is secured to the wheel and extends from the side of the wheel to travel slidably in a slot 61 provided in the beam. Wheel 54 is also pivotally mounted to the beam 51 with a pin 55. This construction permits rotational movement but not the sliding horizontal displacement found at the point of attachment of the other end of the beam to the wheel 57. The respective distance between the axis of rotation and the point of attachment of the beam at 55 to wheel 54 and the axis of rotation on wheel 57 and the point of beam attachment 58 are different, so that turning of the wheel 54 produces an irregular reciprocating motion in the beam 51 and a similar motion in the container in which the food is disposed. While this irregular motion is occurring, heat is applied from the heat source 70 to the container. The heat source 70 can be a propane or gas burner or simple Sterno or other heat producing jellyed fuel. Any type of commercial heat producing burner apparatus can be used. As seen in the drawing, the entire device is conveniently mounted on a pair of frame structures 65 and 66 connected by a platform 67 for holding the heat source.

In the operation of the preferred embodiment, the container 48 is opened in any conventional way in which container lids and bottoms are removed or fastened together such as threaded or hinged disengagement. The pasta and the sauce are placed in the bottom of the container. While the invention is directed towards pasta preparation, other foods can be used in the invention which require constant agitation over a constant source of heat. The pasta which is preferably cooked is fettuccine although rigatoni and other noodles and pastas could be used. The container 48 is then fastened together and the motor 22 is activated causing the lower pulley 26 mounted on the motor shaft 24 to rotate imparting a driving force via the v belt 32 to the larger pulley 28 mounted on rotatable shaft 34 which is supported by the frame. The action of the pulley 28 causes the shaft 34 to rotate and thereby rotate the counterweighted arms 38 which are fixably mounted to the shaft. The rotation of the arms causes beams 42, which are pivotally mounted at assemblies 43 to the ends of the counterweight arms outside of shaft 34, to be reciprocally driven with the support bar 47 mounted to both of the beams 42 also transcribing a closed path so that the container 48, which is mounted on support bar 47, is agitated in must the same manner as a person agitates a pan. The pan is positioned between two radiant heaters 50 which can be selectively adjusted for constant temperature and are turned on during the shaking and agitating process through switch means 49 which is well known. The pasta in container 48 is thus heated to a desired temperature while it is being agitated to coat the pasta noodles with a sauce in the desired manner. If desired, a timer not shown can be set up to the motor 22 and radiant heaters 50 so that after a prescribed length of time, the apparatus will stop its rotation and the heaters will automatically be turned off. At this time, the operator unfastens the lower portion of the container and empties the serving of pasta into a serving dish for delivery to the consumer.

While generally embodiments of the present invention has been described, it will be apparent to those of ordinary skill in the arts that various alternative configurations and embodiments can readily be adapted to the present invention and are considered to fall within the scope thereof as set forth in the following claims.

What is claimed is:

1. A device for simultaneously agitating and applying heat to foods; comprising a frame, elongated beam means disposed on said frame for rotational motion of the ends of said beam means, a container mounted to said beam means, said container being adapted to hold food; rotary drive means, said beam means being connected at a point near one of its ends to said rotary drive means, said rotary drive means being adapted to transcribe a continuous path and impart a substantially reciprocating movement to said beam means; said container being mounted at the other end of said beam means remote from said rotary drive means; support means positioned on said frame between said container and said rotary drive means, said beam means being slidably and pivotally supported on said support means; and means adjacent to said container for applying heat to said container.

2. The device of claim 1 wherein said rotary drive means is a rotating arm.

3. The device of claim 2 wherein said beam means comprises a plurality of parallel spaced members, each member defining a slot therein which receives said support means.

4. The device of claim 3 wherein said support means is a rod.

5. The device of claim 3 wherein said support means is pin means.

6. The device of claim 2 wherein said rotating arm is mounted on a shaft and further comprises counterweight means mounted to an end opposite said beam means.

7. The device of claim 6 wherein said shaft is driven by motor means.

8. A device for simultaneously agitating and applying heat to foodstuff which comprises a frame, an elongated beam means supported by said frame and disposed for repetitive, generally horizontally reciprocating movement, container means mounted to said beam means adapted to hold food; said beam means being pivotally engaged at a point near one end by rotatable arm means, said arm means when rotated causing said point of engagement to transcribe continuously a circular path in a plane of rotation to thereby impart said reciprocating movement to said beam means; said container being disposed at about the other end of said beam means, said beam being slidably and pivotally supported by a support member defined by said beam means to accommodate said reciprocating movement; and means for applying heat to said container.

9. A device for simultaneously agitating and applying heat to pasta comprising a frame, a pair of spaced, parallel elongated members disposed generally horizontally for repetitive, reciprocating movement, pin means mounted to said frame, said members defining channel means therein which engage said pin means, a container mounted at a first end of said members adapted to hold food; rotating arm means engaged to a second end of said members, means to drive said arm means to rotate the second end of said members thereby transcribing a continuously circular path in a vertical plane of rotation to impart reciprocating movement to said members; said members being each slidably and pivotally supported by said pin means, and means for applying selective heat to said container.

10. The device of claim 9 in which said motive force is an electric motor.

11. The device of claim 9 in which the speed of said motive force is controllable.

12. The device of claim 9 in which said means for applying heat is variable in intensity.

13. A device for simultaneously agitating and applying heat to food comprising a frame, elongated beam means mounted to said frame for repetitive, reciprocating movement, a container disposed at about the midpoint of said beam, said container being adapted to hold food; said beam means being pivotally engaged at respective first and second points of engagement near each end thereof to respective first and second rotary means, said first rotary mean causing said first point of engagement to transcribe a continuously circular path in a vertical plane to thereby impart said reciprocating movement to said beam; and means for applying heat to said container disposed beneath the beam.

14. The device of claim 13 wherein said second point of engagement is longitudinally slidable with respect to said beam.

15. The device of claim 14 wherein each of said rotary means is a wheel mounted on a rotating axis.

16. The device of claim 15 wherein one of said wheels is turned by an external motive force, operatively connected therewith.

17. The device of claim 16 wherein said motive force is an electric motor.

18. The device of claim 16 in which said means for applying heat is variable in intensity.

19. A device for simultaneously agitating and applying heat to a pasta and sauce which comprises a frame means, an elongated beam assembly mounted to said frame means, said elongated beam assembly being disposed for repetitive, reciprocating movement which imparts an irregular, rotational motion to a container mounted to said beam; said beam being pivotally engaged at respective first and second points near each of its ends to respective first and second rotatable wheel means, said wheel means each having vertical planes of rotation which are coplanar, such that rotation of one of said wheel means imparts said reciprocating motion to said beam assembly, a food container mounted to said beam assembly between said first and second points, and means for applying heat to said container.

* * * * *